April 8, 1969 W. A. GAMMEL, SR., ET AL 3,437,977

DEMOUNTABLE ELECTRICAL CONTACT ARRANGEMENT

Filed March 22, 1967

INVENTORS
WALTER A. GAMMEL, SR.
JOHN S. STROBEL
BY
Adams, Cwayna & Haugen
ATTORNEYS United States Patent Office 3,437,977
Patented Apr. 8, 1969

3,437,977

DEMOUNTABLE ELECTRICAL CONTACT ARRANGEMENT

Walter A. Gammel, Sr., Minneapolis, and John S. Strobel, Northfield, Minn., assignors to G. T. Schjeldahl Company, Northfield, Minn., a corporation of Minnesota Filed Mar. 22, 1967, Ser. No. 625,200
Int. Cl. H05k *1/08;* H01r *3/02, 9/04*
U.S. Cl. 339—17 8 Claims

ABSTRACT OF THE DISCLOSURE

An arrangement for enhancing the convenience of making an electrical contact between the conductors of a printed circuit, and the contacts of a connector assembly, the conductors on the printed circuit being of copper and coated with a film of indium metal, and the portions of the contacts which mate with those indium coated conductors being plated or otherwise coated with a film of a precious metal such as gold.

The present invention has particular utility in the electrical and electronic arts, particularly in those applications wherein an extremely low resistance and demountable contact is required between the conductors of a printed circuit, such as a harness of printed wiring, or flat conductor cable, and a connector which is adapted to make electrical contact with these individual conductors. Such contacts are normally desired and are sometimes requisite for proper circuitry operation; however, such contacts have been difficult to achieve without the requirement of a plating facility or other cumbersome apparatus.

In the past, various techniques have been employed in order to lower the electrical resistance obtained between mating contacts. These techniques have occasionally utilized the application of films with precious metal to one or both of the contacts, films of gold and platinum being utilized in this regard. While this use of films of precious metals enhances the welding which occurs upon passage of initial current through the contact zone, the applicability of such an arrangement for repeated make-break cycles under field conditions, the cost and the equipment required, render this technique limited. Furthermore, this technique has been difficult to accomplish while utilizing a demountable contact in the field.

In accordance with the present invention, means are provided for establishing an improved demountable electrical connection between a copper conductor and a contact element, the copper conductor being coated with an adherent film of indium, the contact element being provided with an adherent film of a precious metal selected from the group consisting of gold, platinum and iridium or their alloys. The indium is applied to the area of the copper conductor which will mate with the surface of the contact element. Obviously, because of the considerations of expense, the film of precious metal is limited in its application to the mating area per se and areas immediately adjacent thereto.

The metals will amalgamate in the cold following each make-break cycle, however when the apparatus is set into use, the initial electrical pulse may expedite the formation of an amalgamation zone between the indium and the precious metal. The Joule heat ($I^2R$) available at the juncture will provide the required thermal energy. Because of the physical characteristics of the indium and the precious metal, the amalgamation is formed in a weld configuration, and each welded area may be subjected to a substantial number of make-break cycles and reform on each occasion. Also, the indium and precious metals are resistant to formation of undesirable oxide or sulfide films along the exposed surfaces while pure "indium" is normally contemplated, it will be appreciated that indium alloys consisting essentially of indium are contemplated herein.

Therefore, it is a primary object of the present invention to provide an improved arrangement for preparing a demountable electrical connection between a treated contact element and a copper conductor having a film of indium applied thereon.

It is a further object of the present invention to provide an improved technique for establishing electrical connection between a copper conductor and a rigid contact element, the copper conductor being coated with a film of indium, the contact element being coated with a film of a precious metal selected from the group consisting of gold, platinum and iridium.

It is yet a further object of the present invention to provide an improved apparatus for the establishment under field conditions of an electrical connection between a copper conductor which is disposed in ribbon form along a flexible or rigid substrate, and a relatively rigid contact element mating therewith.

Other and further objects will become apparent to those skilled in the art upon a study of the following specification, appended claims, and accompanying drawings, wherein:

Figure 1:
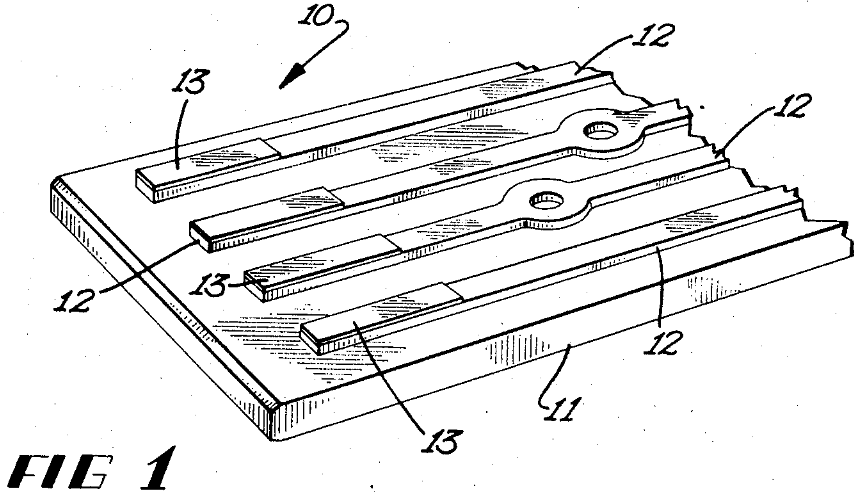
FIGURE 1 is a perspective view of a substrate element having a number of conductors disposed in predetermined relationship upon the surface thereof, the substrate being rigid or flexible, and the conductors being bonded or otherwise secured to the surface of the substrate.
Figure 2:
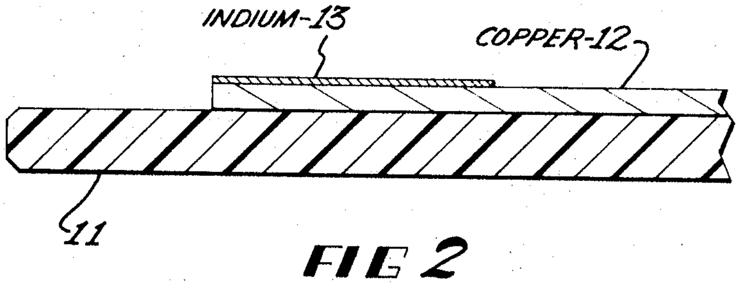
FIGURE 2 is a vertical sectional view, on a greatly enlarged scale, of a portion of that substrate-conductor assembly shown in FIGURE 1.

In accordance with the preferred modification of the present invention, with particular attention being directed to FIGURE 1 of the drawings, the printed circuit element generally designated 10 includes a substrate element 11 along with a plurality of individual conductors 12—12 disposed along the surface thereof. These conductors are, as indicated, of copper, and are securely bonded to the surface of the substrate 11. In one typical example, the substrate 11 may be fabricated from stress-oriented polyethylene terephthalate having a thickness of about ½ mil, the conductors being prepared from ½ oz. copper. Suitable polyester adhesives may be utilized to bond the conductors to the surface of the substrate film. With particular attention being directed to FIGURE 2, it will be observed that the conductor 12 is covered with a film of metal as at 13, this metal film being essentially indium. Indium has a strong affinity for metallic copper, and may be readily applied to the surface of the copper by any convenient technique, such as dipping of the elements in molten indium, or otherwise applying metallic indium being molten or in solution form onto the copper surface. Indium will be deposited by displacement from a salt solution.

Generally, the thickness of the indium film is in the range of about 0.3 mil, this being generally adequate for most purposes of repeatable contact welding. It will be further appreciated that a thickness of between about 0.1 mil and about 1.0 mil will be generally satisfactory for the purposes of the present invention.

Figure 3:
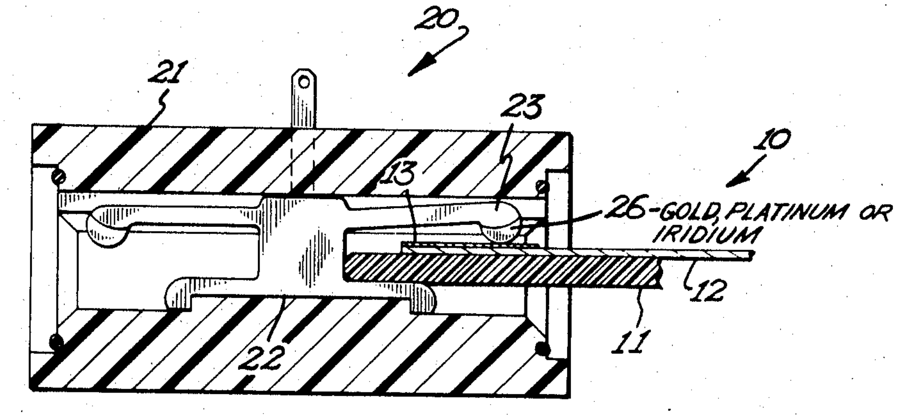
FIGURE 3 is a vertical sectional view of a particular connector element being utilized in combination with the substrate-conductor assembly as illustrated in FIGURES 1 and 2.

Attention is now directed to FIGURE 3 of the drawings wherein the typical application of the present invention is illustrated. In this view, the demountable connector element generally designated 20 includes a receptacle or housing portion 21 including a number of individual contact elements 22 arranged therein. While no unusual demountable connector design is required, it is generally preferred that contact prongs be generally resiliently disposed within the connector body and thereby being enabled to make contact, as desired with the printed circuitry element. These contacts are shown at 23. As an example of one connector element which has been found to ideally function in this operation, reference is made to that certain co-pending application of Walter A. Gammel et al., "Electrical Connector," Serial No. 526,788, filed February 11, 1966, and assigned to the same assignee as the present invention, now Patent No. 3,366,919, issued January 30, 1968.

With particular attention directed to the tip portion of the contact element 23, such as at 26, it will be observed that a film of another material is applied to this portion of the contact. This is the zone wherein mating occurs between the copper conductors and the tips of the contacts 23 during each make-break cycle. This zone 26 is covered with an applied adherent film of a precious metal selected from the group consisting of gold, platinum and iridium, this film preferably having a thickness of about 0.050 mil. It has been found that film having a thickness of between about 0.020 and about 0.200 mil are useful and economically feasible.

It will be appreciated that alloys of these precious metals may be employed as well. It is important to observe, however, that for purposes of achieving ready repeatable amalgamation and welding of the contact mating areas, these alloys should be alloys of the precious metals themselves, these alloys being generally free of stray or foreign constituents. Obviously, certain minor proportions of materials which will not otherwise interfere with the amalgamation and contact welding capabilities may be employed.

The details of the closing or mating of the contact between the printed circuitry element 10 and the connector element 20 are discussed in detail in the patent of Walter A. Gammel et al., supra. Generally, a certain amount of relative motion occurs between the surface of the conductors and the mating portions of the contacts. A modest amount of relative motion is desired in order to prepare the surfaces for amalgamation and ultimate welding. It is desirable, of course, that this relative motion be available with only a slight or modest pressure being applied from the contacts against the copper surface, since the indium metal is relatively soft and flows well under only modest pressure.

It has been indicated that the substrate material for the printed wiring may be either flexible or rigid. When rigid board is employed, epoxy-glass, phenolic, or other rigid materials may be employed. Of course, the technique is applicable other arrangements wherein reasonably broad areas of conductors are exposed and made available for contact with other electrical contacts.

As previously indicated, since the contact elements are preferably somewhat hard, they are better able to retain a film of a precious metal, consistent with their capability of causing modest flow in the surface of the indium metal. Thus, it is preferred that the structure of the contact pin such as at 23, be relatively harder than the copper.

Suitable contact materials are ordinary spring steel, beryllium copper or the like. As indicated, each of these materials is generally relatively harder than copper.

It will be appreciated that the examples provided herein are for purposes of illustration only, and that those skilled in the art may depart from these examples without actually departing from the spirit and scope of the present invention.

What is claimed is:

1. In an apparatus for repeatedly establishing an electrical connection between a copper conductor and a contact element; the combination of (a) a film of a precious metal selected from the group consisting of gold, platinum and iridium, and alloys thereof, applied in adherent relationship to that surface of said contact element adapted for mating contact with said copper conductor, and (b) a film of indium applied in adherent relationship to that surface of said copper conductor adapted for mating contact with said contact element.

2. The combination as set forth in claim 1 being particularly characterized in that said precious metal has a thickness ranging from between about 0.020 mil and 0.02 mil.

3. The combination as set forth in claim 1 being particularly characterized in that said copper conductors are ribbon-like structures having broad exposed surfaces.

4. The combination as set forth in claim 3 being particularly characterized in that the copper ribbon conductors are disposed along the surface of a flexible substrate carrier.

5. The combination as set forth in claim 1 being particularly characterized in that said contact elements are fabricated from a substance relatively harder than copper.

6. The combination as set forth in claim 1 being particularly characterized in that means are provided for demountably connecting said copper conductor and said contact element.

7. The method of establishing a demountable electrical connection between a copper conductor and a contact element; the method comprising the steps of (a) applying a film of a precious metal selected from the group consisting of gold, platinum and iridium, and alloys thereof, in adherent relationship to that surface portion of said contact element adapted for mating contact with said copper conductor; and (b) exposing a zone of said copper conductor for receiving an applied film of indium thereon; and (c) applying a film of indium in adherent relationship to said exposed surface of said copper conductor.

8. The method as set forth in claim 7 being particularly characterized in that said indium film is applied immediately prior to the mating of said contact element and said copper conductor.

References Cited

UNITED STATES PATENTS

| | | | |
|---|---|---|---|
| 2,417,967 | 3/1947 | Booe | 200—166 |
| 3,131,459 | 5/1964 | Allen | 29—601 |
| 3,175,181 | 3/1965 | Grabbe | 339—278 |
| 3,233,034 | 2/1966 | Grabbe | 339—278 X |

MARVIN A. CHAMPION, *Primary Examiner.*

PATRICK A. CLIFFORD, *Assistant Examiner.*

U.C. Cl. X.R.

29—629, 630; 174—68.5; 339—278

U.S. DEPARTMENT OF COMMERCE

PATENT OFFICE

Washington, D.C. 20231

UNITED STATES PATENT OFFICE

CERTIFICATE OF CORRECTION

Patent No. 3,437,977

April 8, 1969

Walter A. Gammel, Sr., et al.

It is certified that error appears in the above identified patent and that said Letters Patent are hereby corrected as shown below:

Column 3, line 56, after "applicable" insert -- to --. Column 4, line 21, "0.02 mil" should read -- 0.20 mil --.

Signed and sealed this 7th day of April 1970.

(SEAL)

Attest:

Edward M. Fletcher, Jr.

Attesting Officer

WILLIAM E. SCHUYLER, JR.

Commissioner of Patents